United States Patent
Allport et al.

(10) Patent No.: US 6,865,561 B1
(45) Date of Patent: Mar. 8, 2005

(54) CLOSED SYSTEM METER HAVING ADDRESS CORRECTION CAPABILITIES

(75) Inventors: Robert W. Allport, Harlow (GB); Stephen Kelly, Welwyn Garden (GB); Timothy J. Nicholls, Standon (GB); Christopher J. Capelli, Millwood, NY (US); Douglas B. Quine, Bethel, CT (US)

(73) Assignee: Pitney Bowes Inc., Stamford, CT (US)

( * ) Notice: Subject to any disclaimer, the term of this patent is extended or adjusted under 35 U.S.C. 154(b) by 898 days.

(21) Appl. No.: 09/222,644

(22) Filed: Dec. 30, 1998

(51) Int. Cl.[7] .............................................. G06F 17/60
(52) U.S. Cl. .............................. 705/406; 1/400; 1/408; 1/410
(58) Field of Search ................................ 705/401, 402, 705/404, 405, 408

(56) References Cited

U.S. PATENT DOCUMENTS

| | | | |
|---|---|---|---|
| 4,725,718 A | | 2/1988 | Sansone et al. |
| 4,743,747 A | | 5/1988 | Fougere et al. |
| 4,831,554 A | | 5/1989 | Storace et al. |
| 4,831,555 A | | 5/1989 | Sansone et al. |
| 4,959,795 A | | 9/1990 | Christensen et al. |
| 5,058,030 A | * | 10/1991 | Schumacher ................ 364/478 |
| 5,168,804 A | | 12/1992 | Lee et al. |
| 5,249,687 A | | 10/1993 | Rosenbaum et al. |
| 5,387,783 A | | 2/1995 | Mihm et al. |
| 5,390,251 A | | 2/1995 | Pastor et al. |
| 5,437,441 A | | 8/1995 | Tuhro et al. |
| 5,452,654 A | * | 9/1995 | Connell et al. ................ 101/91 |
| 5,454,038 A | * | 9/1995 | Cordery et al. ............... 380/23 |
| 5,490,077 A | | 2/1996 | Freytag |

(List continued on next page.)

FOREIGN PATENT DOCUMENTS

| | | | |
|---|---|---|---|
| EP | 0356228 | 2/1990 | |
| EP | 0604148 | 6/1994 | |
| EP | 0710930 A2 | 10/1995 | |
| EP | 0759596 A2 | 8/1996 | |
| GB | 2247376 A * | 2/1992 | ............ H04N/1/10 |

OTHER PUBLICATIONS

"Licking stamps: A PC and a printer will end trips to the post office"–US News and World Report, v125,n12,p67.*

Information–Based Indicia Program (IBIP) Performance Criteria for Information–Based Indicia and closed IBI Postage Metering Systems, USPS, Jan. 12, 1999.*

Postal Service, 39, CFR Parts 111 and 502, Manufacture, Distribution, and Use of Postal Secutiry Devices and Information Based Indicia, Federal Register, Mar. 28, 1997, v62, No. 60; http://www.ribbs.usps.gove/files/fedreg/usps97—97–07861.txt.*

Tygar, J.D. and Lee, B., "Cryptography: It's Not Just For Electronic Mail Anymore" Technical Report CMU–CS–93–107, Carnegie Mellon University, Mar. 1, 1993.

*Primary Examiner*—James P. Trammell
*Assistant Examiner*—Calvin Hewitt
(74) *Attorney, Agent, or Firm*—Brian A. Lemm; Angelo A. Chaclas

(57) ABSTRACT

System and method are provided for generating a Postnet bar code with a closed system metering device. Before an indicium is printed on a mailpiece, a scanner is used to scan recipient address information printed on a mailpiece. Using the scanned information, the metering device determines the Postnet bar code corresponding to the scanned information. A check is then made to determine if the recipient address information has changed from the scanned information. If it has not changed, the metering device prints the postal code on the mailpiece. When the recipient address information has changed, the metering device generates a corrected postal code and prints the corrected postal code and the corrected address on the mailpiece.

3 Claims, 3 Drawing Sheets

U.S. PATENT DOCUMENTS

| | | | |
|---|---|---|---|
| 5,493,106 A | 2/1996 | Hunter | |
| 5,509,109 A | 4/1996 | Kim et al. | |
| 5,586,036 A | 12/1996 | Pintsov | |
| 5,703,783 A | 12/1997 | Allen et al. | |
| 5,731,574 A | 3/1998 | Bodie et al. | |
| 5,761,648 A | 6/1998 | Golden et al. | |
| 5,801,944 A | 9/1998 | Kara | |
| 5,819,240 A * | 10/1998 | Kara | 705/408 |
| 5,819,241 A | 10/1998 | Reiter | |
| 5,953,427 A | 9/1999 | Cordery et al. | |
| 6,026,385 A | 2/2000 | Harvey et al. | |
| 6,041,704 A | 3/2000 | Pauschinger | |
| 6,081,795 A | 6/2000 | Ryan, Jr. | |
| 6,108,643 A | 8/2000 | Sansone | |
| 6,125,357 A | 9/2000 | Pintsov | |
| 6,157,919 A * | 12/2000 | Cordery et al. | 705/60 |
| 6,175,827 B1 | 1/2001 | Cordery et al. | |

* cited by examiner

CLOSED SYSTEM METER HAVING ADDRESS CORRECTION CAPABILITIES

CROSS REFERENCE TO RELATED APPLICATIONS

This application is related to the following co-pending applications filed concurrently herewith and commonly assigned to the assignee of this application: U.S. patent application Ser. Nos. 09/224,255 and 09/223,116, each of which are specifically incorporated herein by reference.

FIELD OF THE INVENTION

The present invention relates generally to postage metering systems. More particularly, the present invention is directed to closed postage metering systems that print digital indicia.

BACKGROUND OF THE INVENTION

Presently, there are two postage metering types: closed systems and open systems. In a closed system, the system functionality is solely dedicated to metering activity. Examples of closed system metering devices include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and: printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention. An example of a digital printing postage meter with secure printhead communication is the Personal Post Office™ manufactured by Pitney Bowes Inc. of Stamford, Conn. An example of a digital printing postage meter in a secure housing is the PostPerfect™ also manufactured by Pitney Bowes Inc. of Stamford, Conn.

Heretofore, closed system postage meters have generally been limited to printing postage indicia on mailpieces. Since open system postage meters, such as PC meters, have access to sender and recipient address information for each mailpiece, they have the capability to perform additional functions that are not available for closed system postage meters. For example, open system meters can perform address cleansing and other value-added services. Closed systems meters do not have such capability.

SUMMARY OF THE INVENTION

It has been found that closed system meters can print an open system indicium by scanning addressee information printed on a mailpiece before generating the indicium. In this manner, an indicium printed by a closed system meter is linked to a mailpiece. This potentially eliminates the need for closed system indicia. Consequently, there would be only one type of indicium printed and, therefore, only one verification system would be needed to verify all digitally printed indicium.

In operation, addressee information, such as a postal code or the entire address, is printed on the mailpiece, preferably in bar code format, when the envelope is addressed. The bar code is scanned by a bar code reader which is operatively coupled to a closed system postage meter, for example in a mailing machine that is processing the mailpiece. Alternatively, an optical character recognition (OCR) reader may scan an alphanumeric address printed on the mailpiece. The addressee information is then included in the information used to encode the indicium for postage evidencing. At verification, the indicium is verified using the same verification process used for verifying open system indicium.

An additional benefit has been found concerning the use by a closed system meter of addressee information scanned from a mailpiece. In accordance with the present invention, a closed system meter coupled to a scanner can determine and generate a Postnet bar code for a mailpiece that is printed on the mailpiece when the closed system meter prints an indicium on the mailpiece. In addition, the postage meter can perform change of address correction on the mailpiece, which provides expedited delivery of the mailpiece in addition to potential reduction in the postage for such delivery. Thus, the present invention increases the utility and value of such a closed system meter over conventional closed system meters.

In accordance with the present invention, system and method are provided for generating a Postnet bar code with a closed system metering device. Before an indicium is printed on a mailpiece, a scanner is used to scan recipient address information printed on a mailpiece. Using the scanned information, the metering device determines the Postnet bar code corresponding to the scanned information. A check is then made to determine if the recipient address information has changed from the scanned information. If it has not changed, the metering device prints the postal code on the mailpiece. When the recipient address information has changed, the metering device generates a corrected postal code and prints the corrected postal code and the corrected address on the mailpiece.

Therefore, it is now apparent that the present invention substantially overcomes the disadvantages associated with the prior art. Additional advantages of the invention will be set forth in the description, which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated herein and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

Figure 1:
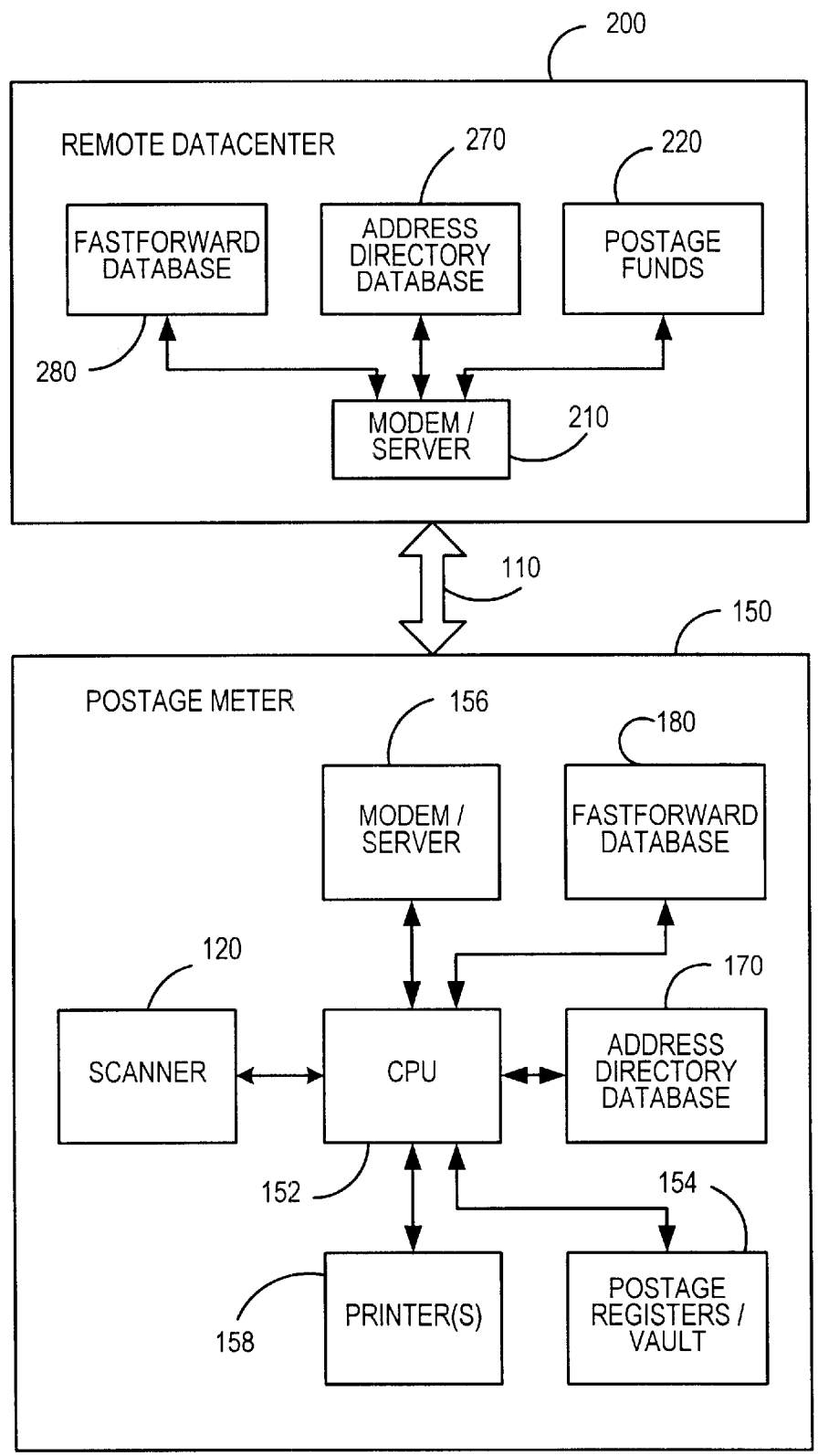
FIG. 1 is a preferred embodiment of a closed system metering device in accordance with the present invention.

In previously noted, related U.S. patent application Ser. No. 09/224,255, a closed system meter is provided which scans destination address information from a mail piece in order to include at least some part of the destination address information in an indicium. The address may be in human readable or barcode format. The inclusion of the destination address information in the indicium enhances the security of a metering system by making the detection of duplicate indicia much easier. The present invention expands upon this idea by using the address information, as well as additional information printed on the mail piece, to allow the meter to generate a Postnet bar code for a mailpiece and to perform change of address correction on the mailpiece as necessary.

In accordance with the present invention, a postage meter is provided with an optical scanner for scanning a mailpiece as it is conveyed through the postage meter. Through OCR techniques, the processor of the meter can determine the Postnet bar code for the recipient's address based upon recipient's address information imprinted on the surface of the mailpiece. Using this information, the processor of the meter uses an address directory lookup table (preferably provided in the postage meter) to determine the Postnet bar code. Once the Postnet barcode is determined, a digital printer in the meter is then used to imprint the Postnet barcode on the outside of the mailpiece to provide expedited delivery of the mailpiece as well as potential reduction in postage for the mailpiece.

FASTforward™ is an address management tool provided by the United States Postal Service (USPS) that allows mailers to get the latest correct address on mailpieces immediately before entry into the mailstream service. Heretofore, FASTforward™ has not been available for direct use with closed system postage meters.

In accordance with the present invention, the postage meter can also perform FASTforword™ functions in which once the Postnet bar code is determined, it uses this barcode to determine if there has been a change of address registered for the recipient with the USPS. If there is no change, the Postnet bar code is printed on the mailpiece. If there is a change of address, the new Postnet barcode with the forwarding address is printed on the mailpiece also providing expedited delivery of the mailpiece as well as potential further reduction in postage for the mailpiece. This Fastforword information is obtained from a Fastforword lookup table preferably provided in the postage meter. The lookup table for both Fastforword and the Address directory can be any known electronic storage medium, such as hard drive, floppy disk, CR ROM, DVD and the like.

The postage meter can further connect to a remote database to download recent data from either an address directory database and/or a fast forward database. Of course, this new data could also be directly input into the postage meter via floppy disks, CD ROMs, DVD and the like.

Referring now to FIG. 1, a preferred embodiment of the present invention is shown in which a closed system postage meter 150 includes a processor 152, NVM 154, modem 156 and a digital printer 158. NVM 154 is used in a conventional manner for storing ascending and descending postage registers. Also included in postage meter 150 is a scanner 120, such as a barcode reader or OCR reader. In an alternate embodiment (not show), scanner 120 is externally coupled to meter 150 in a conventional manner.

Meter 150 also includes an address directory database 170 which is used to determine the Postnet barcode of the recipient address printed on the mailpiece, and an address correction database 180, such as FASTforward™, which is used to correct addresses the address printed on the mailpiece.

Postage meter 150 is in communication with a data center 200 over any suitable communication network 110 (LAN, WAN, telephone line, internet, etc.). Data center 200 includes a modem or server 210 for communicating with postage meter 150. Account information for a plurality of users is stored in a database 220. Data center 200 preferably includes an address directory database 270 and a FASTforward™ database 280, which comprise current address directory and address correction information that can be downloaded to corresponding databases in postage meter 150. Alternatively, address directory database 270 and FASTforward™ database 280 may be located remote from data center 200, for example, the databases may be maintained by the USPS. Generally, it is anticipated that the postage meter 150 would be located in small business offices and/or in private residences and used for a variety of purposes including obtaining postage. The data center 200 is maintained and operated by an authorized postage meter manufacturer or some other authorized agency.

During mailpiece generation, elements of the address are used to generate a code specific to the mailpiece destination address. Such elements may be a postal code (zip code) or may include other elements such as a house number or street name. Once the code has been generated, it can be printed, preferably in bar code format, with the address, for example, in the address block of the mailpiece. A bar code is preferable because it is more reliable to scan in a bar code than to OCR scan the alphanumeric characters from the address block of the mailpiece.

As the mailpiece passes under the scanner 120, information, such as addressee information, is read from the mailpiece. The scanned addressee information is transmitted to processor 152 so that it can be encoded into the indicium as previously noted. In accordance with the present invention, the scanned information is then processed to determine if the addressee information is correct and to determine the Postnet barcode for the mailpiece.

It is noted that printer 158 may be a conventional stationary printer that prints as envelope 20 is conveyed past. However, it will be understood that printer 158 may include movable printheads that move in an orthogonal path to the direction of envelope conveyance.

Figure 2:
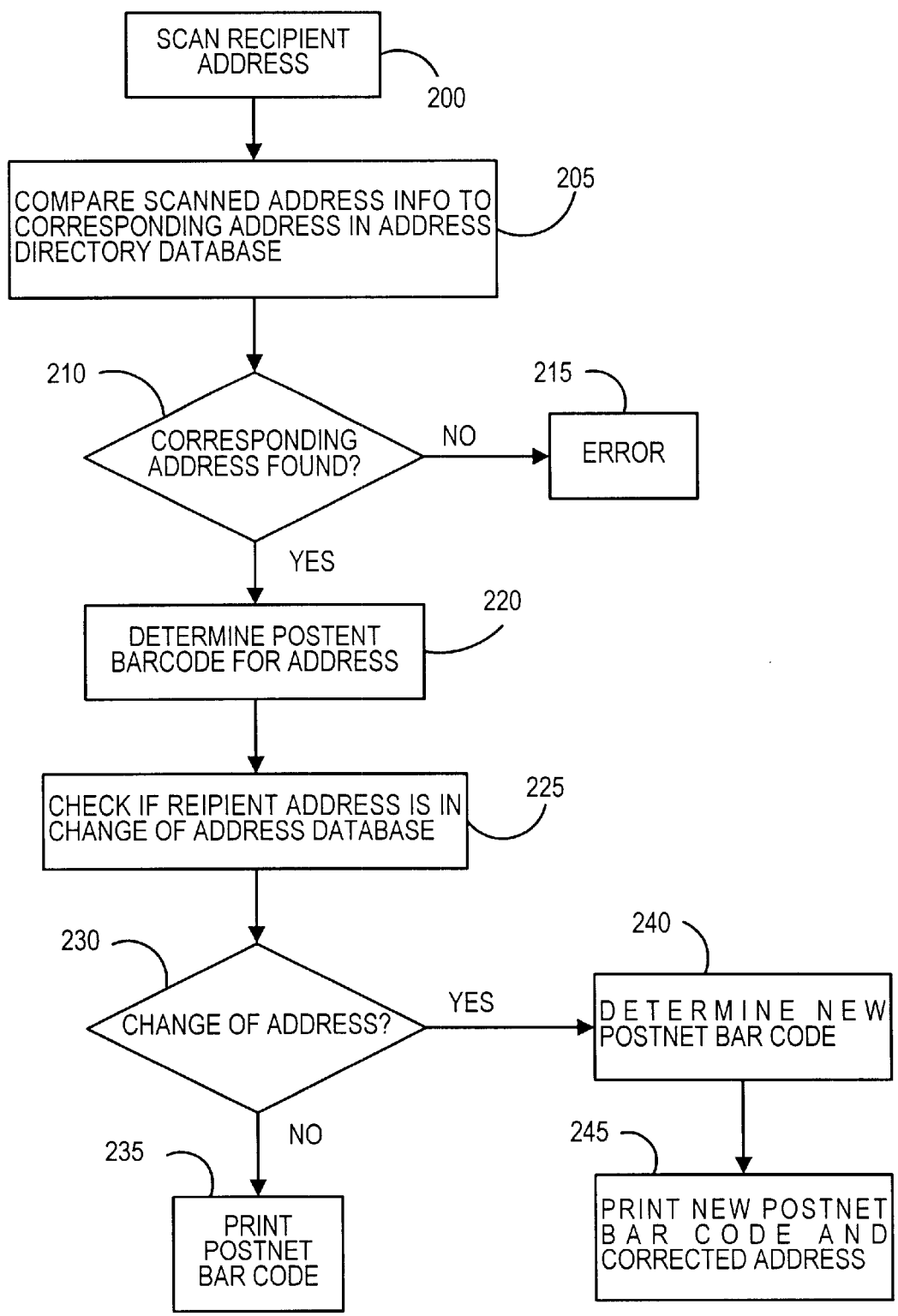
FIG. 2 is a flow chart of a method for linking an: indicium to a mailpiece for closed system meter devices of FIG. 1.

Referring primarily now to FIG. 2, the process in accordance with the present invention is shown. At step 200, the mailpiece is scanned. The scanning may be an OCR scan of the recipient address printed on the mailpiece. Alternatively, the scan may be a bar code scan, such as a Postnet bar code, of a bar code representative of the recipient address. At step 205, the scanned information is compared to a corresponding address in the address directory database 170. If a corresponding address is not found at step 210, an error is indicated at step 215 and the information must be entered manually or a Postnet bar code cannot be generated. If a corresponding address is found, then at step 220 the Postnet bar code is generated using the address in the address directory database 170. At step 225, the change of address database is searched to determine whether that recipient address has changed, for example, because the recipient has relocated to another address. If there is no change in address at step 230, the Postnet bar code is printed at step ?35. If there is a change in address at step 230, then at step 240 a new Postnet bar code is generated, At step 245, the new Postnet bar code and the new address are printed on the mailpiece.

Figure 3:
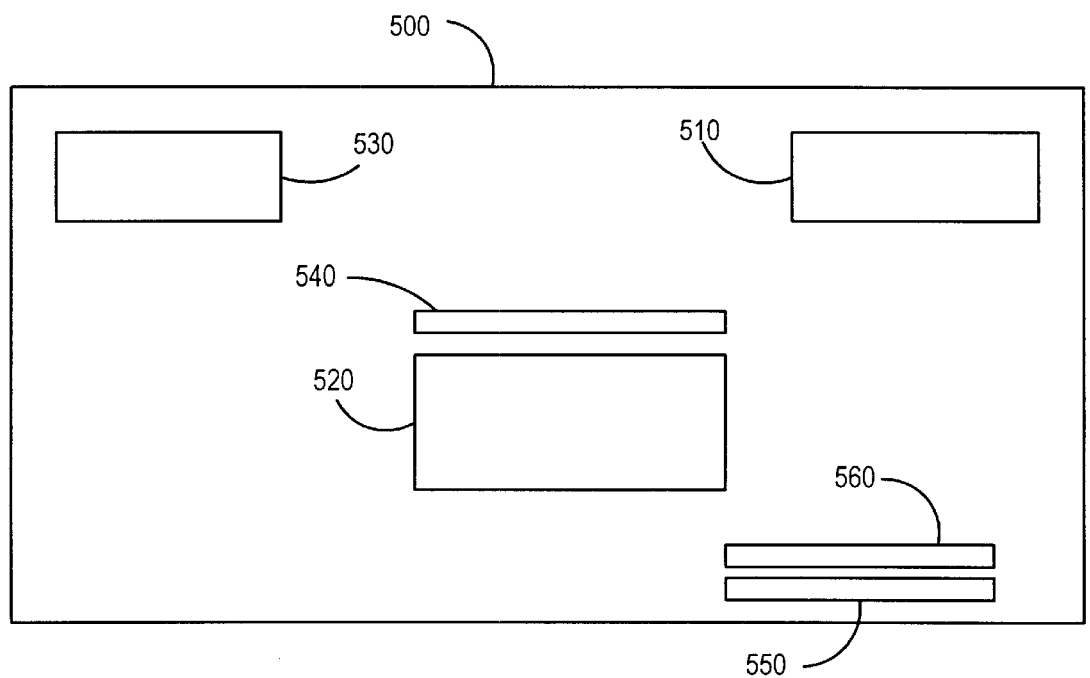
FIG. 3 is a front view of an envelope that has been processed by the postage printing system in accordance with the present invention.

Referring now to FIG. 3, a typical envelope 500 containing corrected recipient address information and Postnet bar code printed thereon is shown. Envelope 500 contains a postal indicium 510, recipient address block 520 and return address block 530. The original Postnet bar code 540 representing the address printed in recipient address block 520 is printed at step 230 above. The new Postnet bar code 550 and the new address 560 are printed at step 240 above.

An alternate embodiment of the present invention comprises a mailing machine/closed system meter system similar to that described in previously noted, related U.S. patent application Ser. No. 09/223,116. In the alternate embodiment, the databases are located within the mailing machine and a second printer in the mailing machine prints the Postnet bar code and corrected address.

Many features of the embodiments disclosed herein represent design choices selected to exploit the inventive concept as implemented in a particular virtual postage meter environment. However, those skilled in the art will recognize that various modifications can be made without departing from the spirit of the present invention. For example, the closed system postage meter 150 may be a virtual, closed system postage meter as described in U.S. patent application Ser. No. 08/993,358, filed Dec. 18, 1997, which is hereby specifically incorporated herein by reference. Other variations of this system would allow the printing of bar coded information to be done with invisible ink or on the back of the mail piece to avoid cluttering the face of the mail piece. It will be understood by those skilled in the art that the present invention is not limited for use with the USPS. Any postal code required by any Post can be substituted for the Postnet bar code.

Therefore, the inventive concept in its broader aspects is not limited to the specific details of the preferred embodiments described above, but is defined by the appended claims and their equivalents.

What is claimed is:

1. A method for generating a postal bar code with a closed system metering device, the method comprising:

coupling a scanning device to a closed system postage meter;

scanning recipient address information printed on a mailpiece;

determining a postal code corresponding to the recipient address; and printing the postal code on the mailpiece.

2. The method of claim 1 comprising the further step of:

comparing the recipient address information to corresponding address in an address directory database before determining the postal code.

3. The method of claim 1 comprising the further steps of:

determining if the recipient address information has changed;

generating a corrected postal code when the recipient address information has changed; and printing the corrected postal code and the corrected address on the mailpiece.

* * * * *